US008509110B2

(12) United States Patent
Kim et al.

(10) Patent No.: US 8,509,110 B2
(45) Date of Patent: Aug. 13, 2013

(54) CELL SEARCHING METHOD AND APPARATUS IN MULTI-CARRIER SYSTEM

(75) Inventors: So Yeon Kim, Anyang-si (KR); Han Gyu Cho, Anyang-si (KR); Jae Hoon Chung, Anyang-si (KR); Sung Ho Moon, Anyang-si (KR); Seung Hee Han, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 76 days.

(21) Appl. No.: 13/378,995

(22) PCT Filed: Jun. 21, 2010

(86) PCT No.: PCT/KR2010/004007
§ 371 (c)(1),
(2), (4) Date: Dec. 16, 2011

(87) PCT Pub. No.: WO2010/147445
PCT Pub. Date: Dec. 23, 2010

(65) Prior Publication Data
US 2012/0093021 A1    Apr. 19, 2012

Related U.S. Application Data

(60) Provisional application No. 61/218,436, filed on Jun. 19, 2009.

(51) Int. Cl.
*H04L 12/28* (2006.01)
*H04L 12/56* (2011.01)
*H04W 4/00* (2009.01)

(52) U.S. Cl.
USPC .................. 370/252; 370/254; 370/328

(58) Field of Classification Search
USPC ................................ 370/252, 254, 328
See application file for complete search history.

(56) References Cited

U.S. PATENT DOCUMENTS

| 7,477,920 | B2 | 1/2009 | Scheinert et al. | |
|---|---|---|---|---|
| 2009/0316659 | A1* | 12/2009 | Lindoff et al. | 370/332 |
| 2009/0323957 | A1* | 12/2009 | Luo et al. | 380/270 |

OTHER PUBLICATIONS

Qualcomm Europe, "Optimized handover in the presence of PCI confusion," R2-083268, 3GPP TSG RAN WG2 62bis, Jun. 2008.
Nokia Siemens Networks, "SON Use Case: Cell Phy_ID Automated Configuration," R3-080376, 3GPP TSG-RAN WG3 Meeting #59, Feb. 2008.
Qualcomm Europe et al., "Automatic Physical Cell Identity Selection in LTE: Requirements and Solutions," R3-081090, 3GPP TSG-RAN WG3 #60, May 2008.

* cited by examiner

*Primary Examiner* — Ronald Abelson
(74) *Attorney, Agent, or Firm* — Lee, Hong, Degerman, Kang & Waimey

(57) ABSTRACT

Provided are a cell searching method and an apparatus in a multi-carrier system. A terminal acquires a first physical cell identity (PCI) for a first downlink component carrier, and acquires an expanded PCI for a second downlink component carrier. A first downlink reference signal through the first downlink element carrier is transmitted on the basis of the PCI, and a second downlink reference signal through the second downlink component carrier is transmitted on the basis of the expanded PCI.

16 Claims, 18 Drawing Sheets

FIG. 7
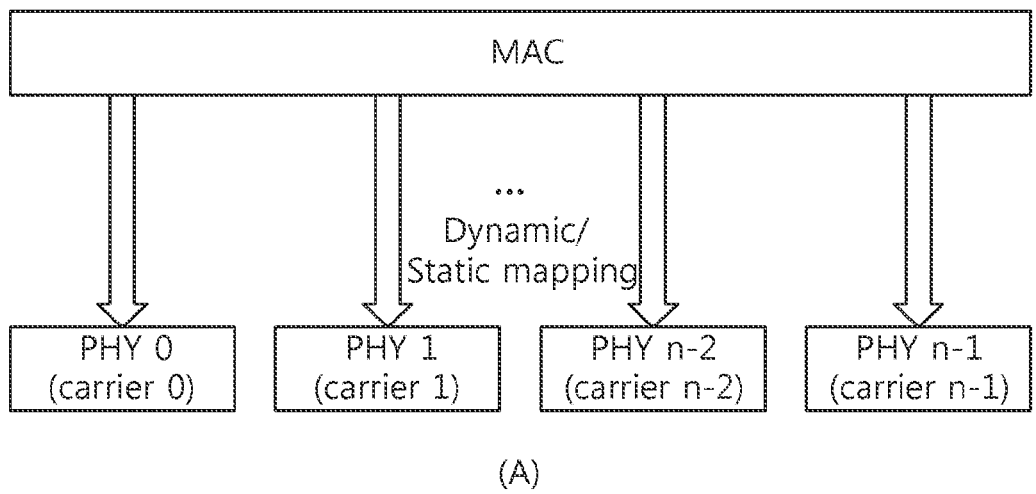
(A)
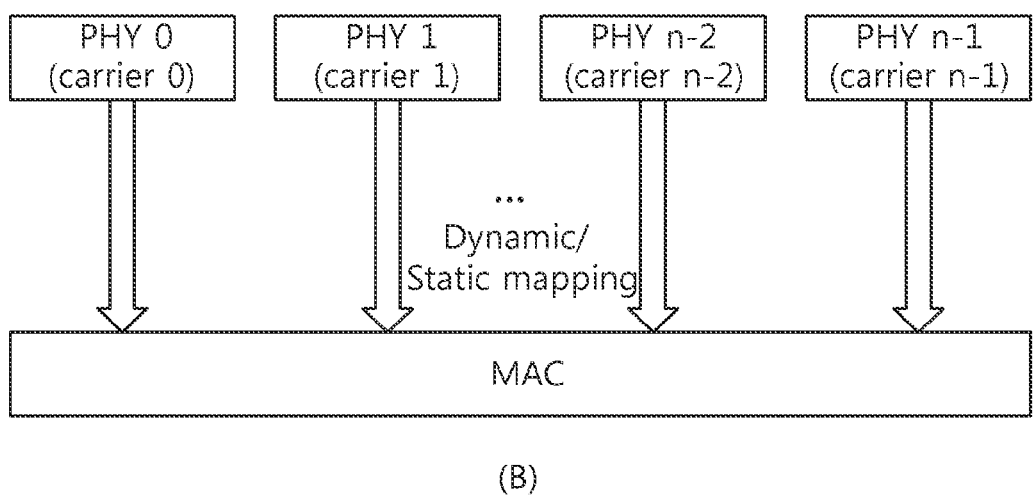
(B)

FIG. 8
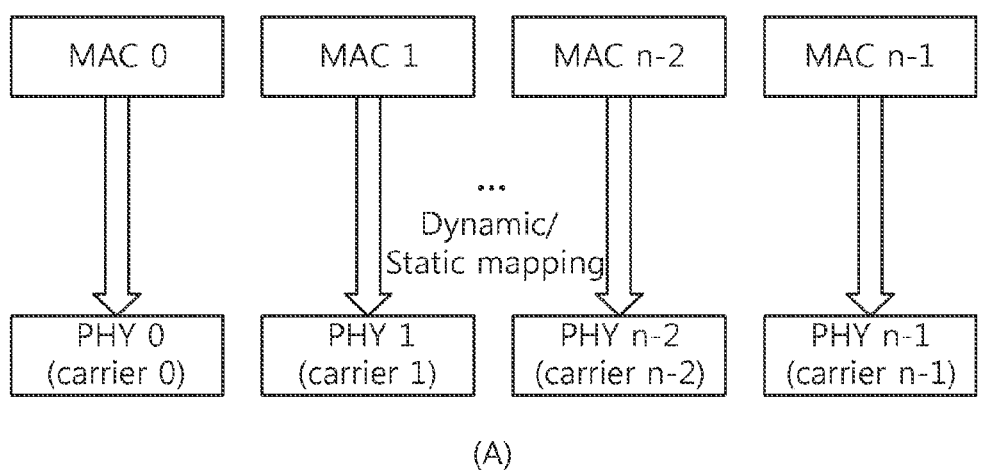
(A)
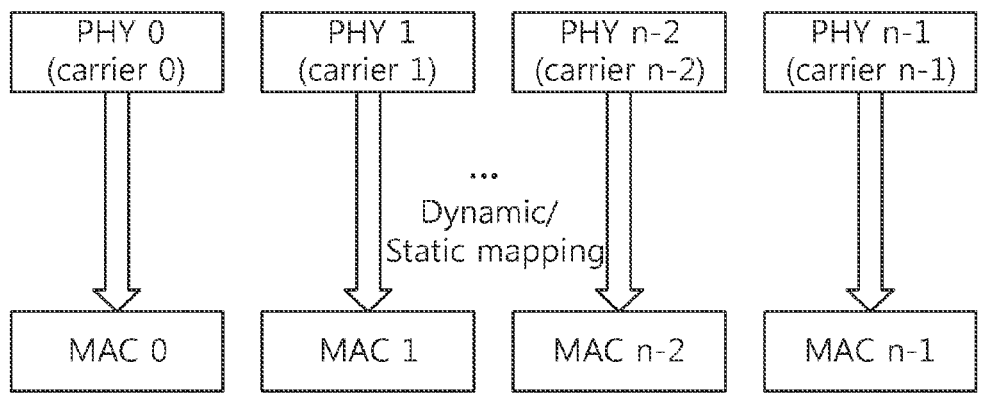
(B)

FIG. 9
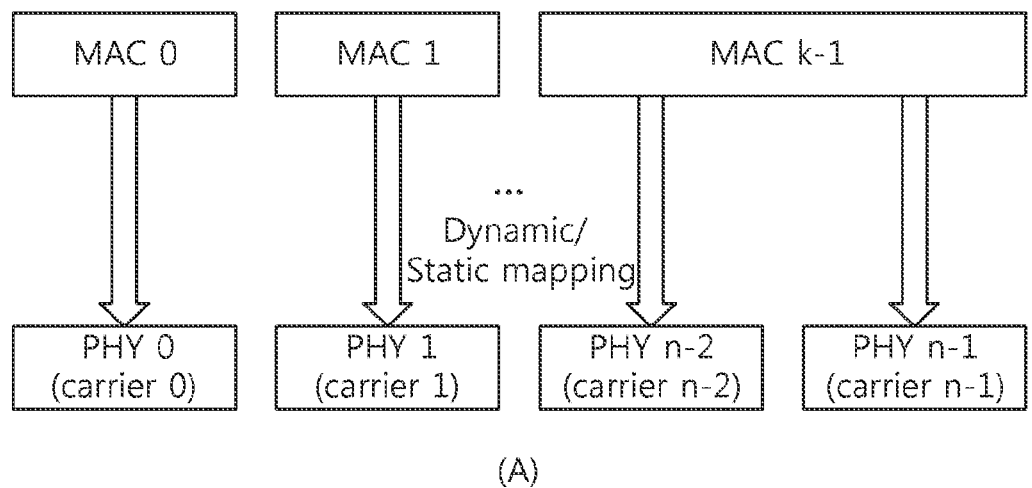
(A)
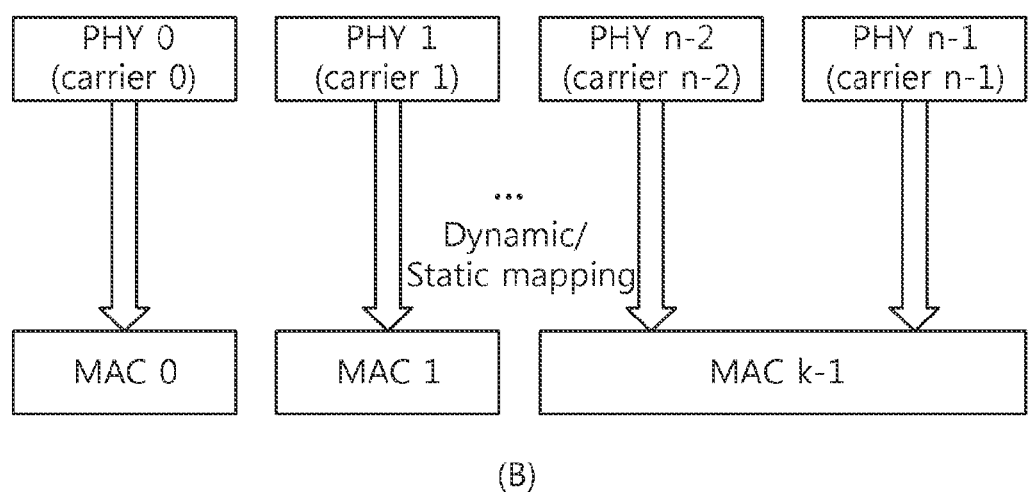
(B)

FIG. 11
(A)
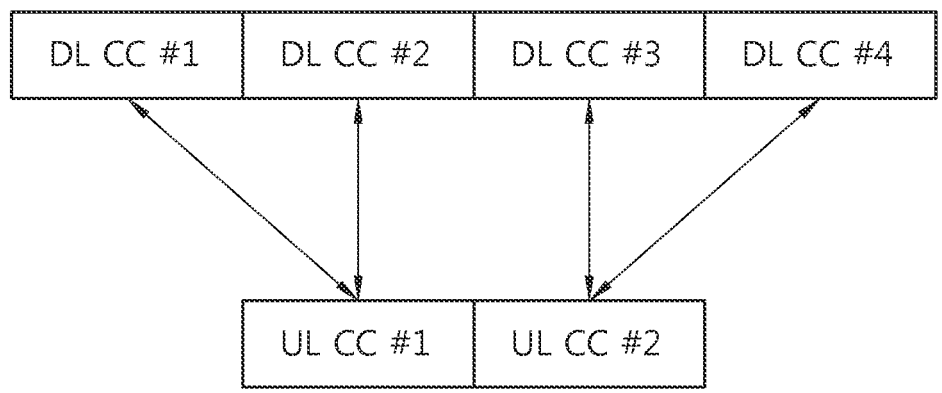
(B)
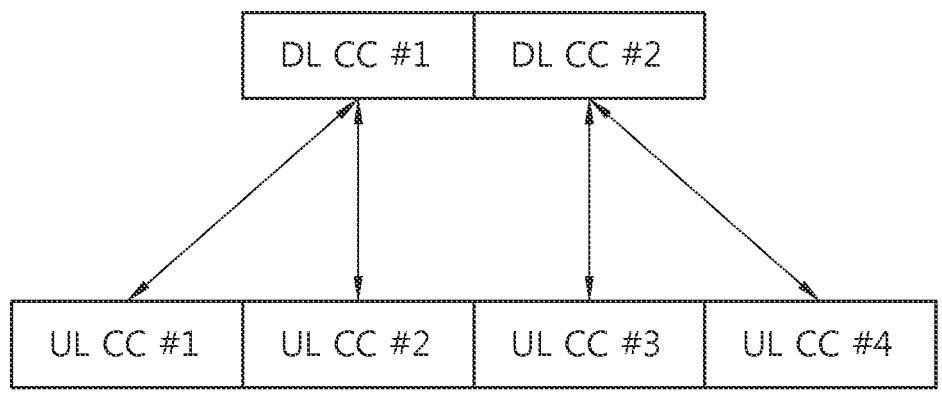

FIG. 12
(A)
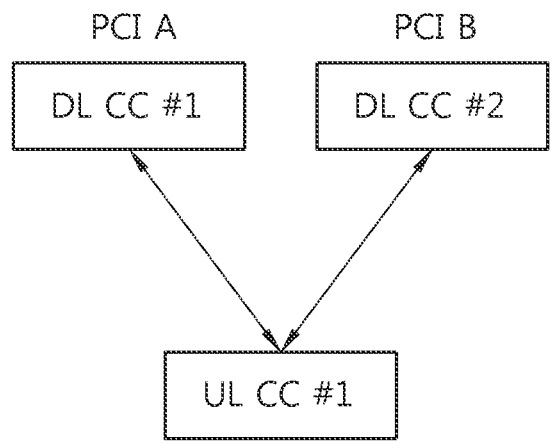
(B)
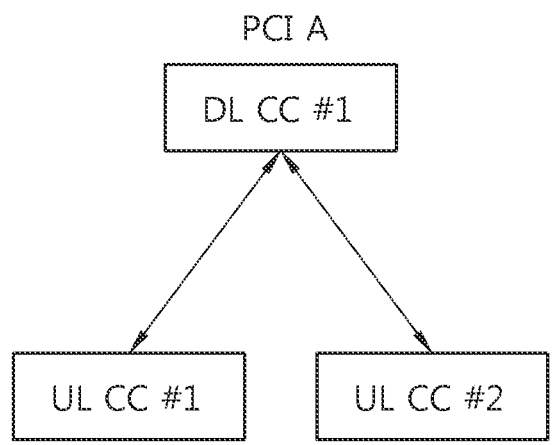

CELL SEARCHING METHOD AND APPARATUS IN MULTI-CARRIER SYSTEM

CROSS-REFERENCE TO RELATED APPLICATIONS

This application is the National Stage filing under 35 U.S.C. 371 of International Application No. PCT/KR2010/004007, filed on Jun. 21, 2010, which claims the benefit of U.S. Provisional Application Ser. No. 61/218,436, filed on Jun. 19, 2009, the contents of which are all hereby incorporated by reference herein in their entirety.

TECHNICAL FIELD

The present invention relates to wireless communication and, more particularly, to a communication method and apparatus in a multiple carrier system.

BACKGROUND ART

3rd Generation Partnership Project (3GPP) Long Term Evolution (LTE) (i.e., the improvement of a Universal Mobile Telecommunications System (UMTS)) is introduced as 3GPP release 8. 3GPP LTE uses Orthogonal Frequency Division Multiple Access (OFDMA) in downlink and uses Single Carrier-Frequency Division Multiple Access (SC-FDMA) in uplink. Multiple Input Multiple Output (MIMO) having a maximum of 4 antennas is adopted. Recently, a discussion on 3GPP LTE-Advanced (LTE-A) which is the evolution of 3GPP LTE is in progress.

Technology introduced in 3GPP LTE-A includes a carrier aggregation, a relay, etc. A 3GPP LTE system is a single carrier system that supports only one bandwidth (i.e., one component carrier) of {1.4, 3, 5, 10, 15, 20} MHz. However, LTE-A is introducing multiple carriers employing a carrier aggregation. A component carrier is defined by a center frequency and a bandwidth. A multiple carrier system uses a plurality of component carriers having a smaller bandwidth than the entire bandwidth.

If a channel structure or a reference signal structure designed on the basis of the existing single carrier is used without change because a plurality of component carriers is used, the ambiguity of an operation may occur.

DISCLOSURE

Technical Problem

The present invention provides a cell search method and apparatus for obtaining a Physical Cell Identity (PCI) for every component carrier in a multiple carrier system.

The present invention provides a method and apparatus for distinguishing a backward compatible component carrier and a backward non-compatible component carrier from each other.

Technical Solution

In an aspect, a cell search method in a multiple carrier system includes obtaining a first physical cell identity (PCI) for a first downlink component carrier, and obtaining an extended PCI for a second downlink component carrier. A first downlink reference signal through the first downlink component carrier is transmitted based on the PCI, and a second downlink reference signal through the second downlink component carrier is transmitted based on the extended PCI.

The extended PCI may be obtained based on a primary synchronization signal (PSS) and a secondary synchronization signal (SSS) on the second downlink component carrier.

The first PCI may be obtained in a range of 0 to 503, and the extended PCI may have a value greater than 503.

The step of obtaining the extended PCI may include obtaining a second PCI for the second downlink component carrier based on a PSS and a SSS on the second downlink component carrier, and obtaining the extended PCI based on the second PCI.

In another aspect, a user equipment for performing a cell search in a multiple carrier system includes a radio frequency (RF) unit configured to transmit and receive radio signals, and a processor coupled to the RF unit and configured to perform the cell search. The processor is configured to obtain a first physical cell identity (PCI) for a first downlink component carrier, and obtain an extended PCI for a second downlink component carrier. A first downlink reference signal through the first downlink component carrier is transmitted based on the PCI, and a second downlink reference signal through the second downlink component carrier is transmitted based on the extended PCI.

Advantageous Effects

Ambiguity of an operation due to a Physical Cell Identity (PCI) in a multiple carrier system can be solved.

DESCRIPTION OF DRAWINGS

FIG. 7 shows an example of a transmitter and a receiver in which one MAC operates multiple carriers.

FIG. 8 shows an example of a transmitter and a receiver in which multi-MAC operates multiple carriers.

FIG. 9 shows another example of a transmitter and a receiver in which multi-MAC operates multiple carriers.

FIG. 11 shows an example of an asymmetric aggregation.

FIG. 12 shows ambiguity due to a PCI in an asymmetric aggregation.

MODE FOR INVENTION

A user equipment (UE) may be fixed or mobile and also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

A Base Station (BS) commonly refers to a fixed station communicating with UEs, and it may be called another terminology, such as an evolved-NodeB (eNB), a Base Transceiver System (BTS), or an access point.

Each BS provides communication service to a specific geographical area (commonly called a cell). The cell may be classified into a plurality of areas (called sectors).

Hereinafter, downlink (DL) means communication from a BS to UE, and uplink (UL) means communication from UE to a BS. In downlink, a transmitter may be part of a BS, and a receiver may be part of UE. In uplink, a transmitter may be part of UE, and a receiver may be part of a BS.

Figure 1:
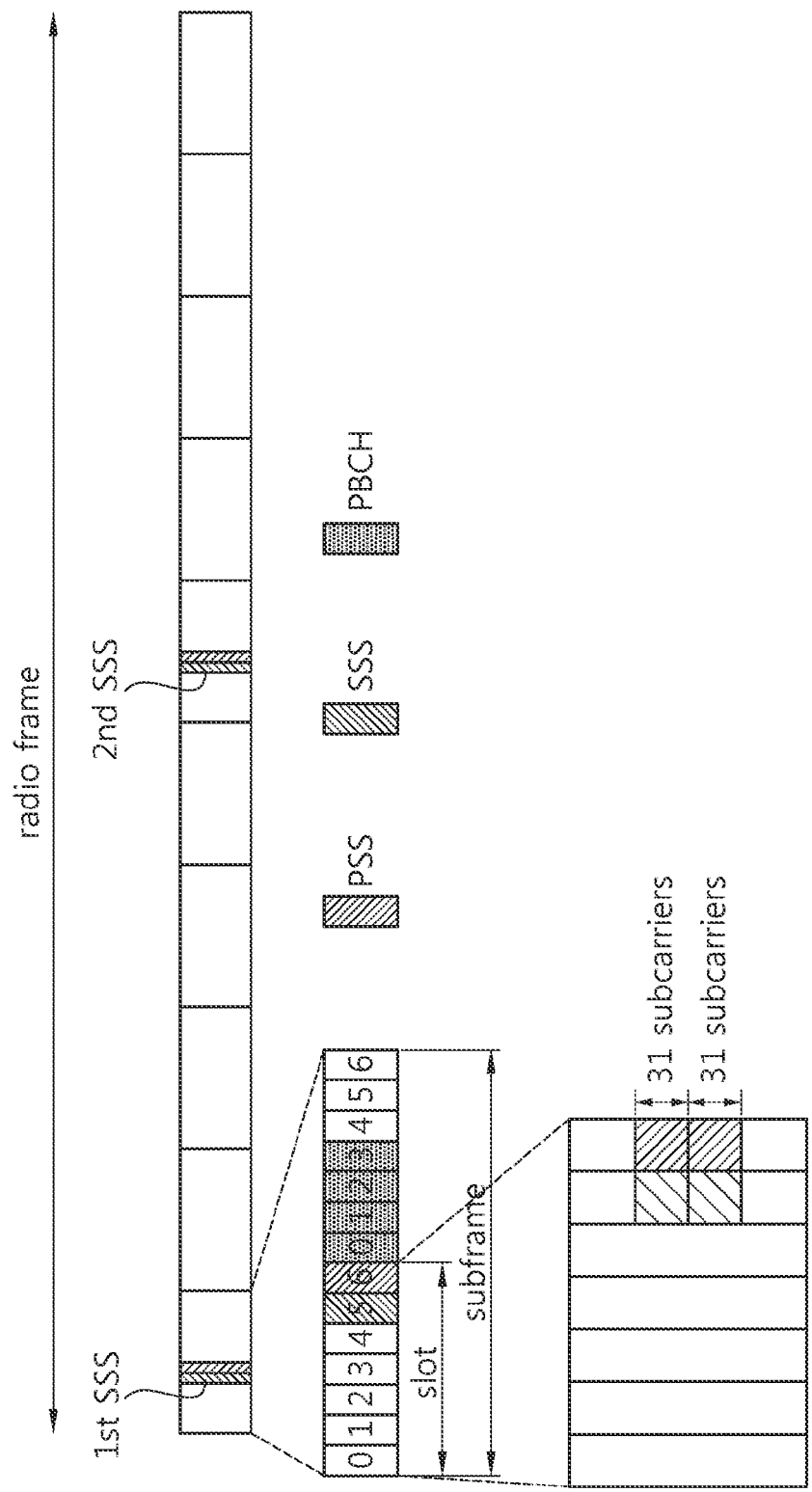
FIG. 1 shows the structure of a radio frame in 3GPP LTE.

FIG. 1 shows the structure of a radio frame in 3GPP LTE. For the structure of the radio frame, reference may be made to section 6 of 3GPP TS 36.211 V8.7.0 (2009-05) "Evolved Universal Terrestrial Radio Access (E-UTRA); Physical Channels and Modulation (Release 8)". The radio frame includes 10 subframes to which respective indices 0 to 9 are assigned, and one subframe includes two slots. The time that one subframe is taken to be transmitted is called a Transmission Time Interval (TTI). For example, the length of one subframe may be 1 ms, and the length of one slot may be 0.5 ms.

One slot may include a plurality of Orthogonal Frequency Division Multiplexing (OFDM) symbols in the time domain. The OFDM symbol is only for representing one symbol period in the time domain because 3GPP LTE uses Orthogonal Frequency Division Multiple Access (OFDMA) in downlink and is not restricted to a multiple access method or a name. For example, the OFDM symbol may be called another name, such as a Single Carrier Frequency Division Multiple Access (SC-FDMA) symbol or a symbol period.

One slot has been illustrated to include 7 OFDM symbols, but the number of OFDM symbols included in one slot may be changed depending on the length of a Cyclic Prefix (CP). In accordance with 3GPP TS 36.211 V8.7.0 (2009-05), one subframe includes 7 OFDM symbols in a normal CP and includes 6 OFDM symbols in an extended CP.

A Resource Block (RB) is a resource assignment unit, and it includes a plurality of subcarriers in one slot. For example, if one slot includes 7 OFDM symbols in the time domain and an RB includes 12 subcarriers in the frequency domain, one RB may include 7×12 Resource Elements (REs).

A Primary Synchronization Signal (PSS) is transmitted in the last OFDM symbol of a first slot (the first slot of a first subframe (a subframe having an index 0) and in the last OFDM symbol of an eleventh slot (the first slot of a sixth subframe (a subframe having an index 5). The same PSS is transmitted in two OFDM symbols. The PSS is used to obtain OFDM symbol synchronization or slot synchronization and is associated with a Physical Cell Identity (PCI).

A Secondary Synchronization Signal (SSS) includes a first SSS transmitted in an OFDM symbol prior to the last OFDM symbol of the first slot and a second SSS transmitted in an OFDM symbol prior to the last OFDM symbol of the eleventh slot. Unlike the PSS, different SSSs are transmitted in two OFDM symbols. The SSS is used to acquire frame synchronization. The SSS, together with the PSS, is used to obtain a PCI.

A Physical Broadcast Channel (PBCH) is transmitted in 4 former OFDM symbols of the second slot of a first subframe. The PBCH carries system information that is essential for UE to communicate with a BS. System information transmitted through the PBCH is called a Master Information Block (MIB). Meanwhile, system information transmitted through a Physical Downlink Shared Channel (PDSCH) indicated by a Physical Downlink Control Channel (PDCCH) is called a System Information Block (SIB).

Figure 2:
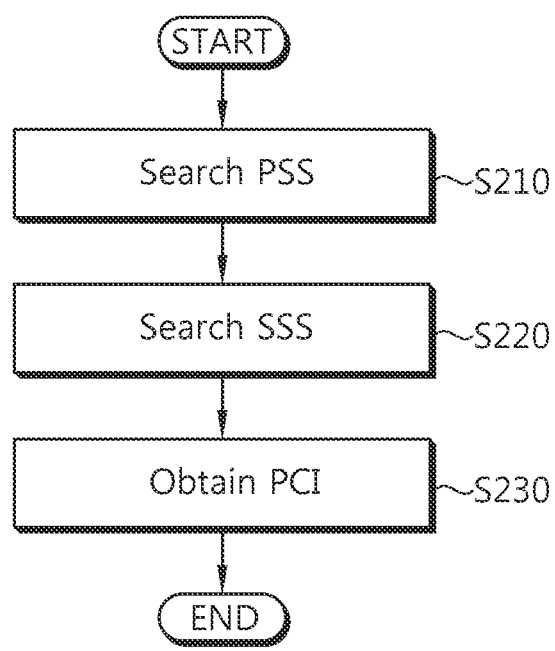
FIG. 2 is a flowchart showing a cell search process in 3GPP LTE.

FIG. 2 is a flowchart showing a cell search process in 3GPP LTE. A cell search is a process of UE obtaining time and frequency synchronization with a cell and obtaining the cell identifier of a cell.

A UE searches for a PSS (S210). The UE obtains slot synchronization through the PSS. Furthermore, the UE may obtain frequency synchronization through the PSS.

Next, the UE searches for an SSS (S220). The UE obtains frame synchronization through the SSS.

The PCI of the cell is obtained by using the SSS and the PSS (S230).

3GPP LTE includes 504 unique PC's. The cell identifiers are grouped into unique PCI groups each including 168 PC's. Each PCI group has a unique identifier $N^{(2)}_{ID}$. Three PSSs are mapped to three identifiers $N^{(2)}_{ID}$, respectively.

As disclosed in section 6.11 of 3GPP TS 36.211 V8.7.0 (2009-05), a sequence $d_u(n)$ used in the PSS is generated from the following Zadoff-Chu (ZC) sequence.

$$d_u(n) = \begin{cases} e^{-j\frac{\pi u n(n+1)}{63}} & n = 0, 1, \ldots, 30 \\ e^{-j\frac{\pi u n(n+1)(n+2)}{63}} & n = 31, 32, \ldots, 61 \end{cases} \quad \text{Equation 1}$$

Here, the root index u of the ZC sequence is as follows.

TABLE 1

| $N^{(2)}_{ID}$ | Root index u |
|---|---|
| 0 | 25 |
| 1 | 29 |
| 2 | 34 |

The SSS includes a first SSS and a second SSS and consists of sequences in each of which the length of the two SSSs is 31 (referred to as a first Second Synchronization Code (SSC) $s_0$ and a second SSC $s_1$, respectively). The first SSS transmitted in a subframe 0 having an index 0 and the second SSS transmitted in a subframe 5 having an index 5 may be represented as follows.

$$d(2n) = \begin{cases} s_0^{(m0)}(n)c_0(n) & \text{in } subframe0 \\ s_1^{(m1)}(n)c_0(n) & \text{in } subframe5 \end{cases} \quad \text{Equation 2}$$

$$d(2n+1) = \begin{cases} s_1^{(m1)}(n)c_1(n)z_1^{(m0)}(n) & \text{in } subframe0 \\ s_0^{(m0)}(n)c_1(n)z_1^{(m1)}(n) & \text{in } subframe5 \end{cases}$$

Here, $0 \leq n \leq 30$, $c_0(n)$, and $c_1(n)$ are scrambling sequences obtained on the basis of $N^{(2)}_{ID}$, and $z^{(m0)}_1$ and $z^{(m1)}_1$ are scrambling sequences obtained on the basis of m0 and m1.

According to Equation 2, the order of $s_0$ and $s_1$ of the first SSS and the second SSS is switched (i.e., the first SSS is the order of $s_0$ and $s_1$, but the second SSS is the order of $s_1$ and $s_0$), but the order of the scrambling sequences $c_0(n)$ and $c_1(n)$ is not switched.

The first SSC $s^{(m0)}_0$ and the second SSC $s^{(m1)}_1$ are two different cyclic shifts of m-sequence s(n) and are defined as follows.

$$s_0^{(m0)}(n)=s((n+m0) \bmod 31)$$

$$s_1^{(m1)}(n)=s((n+m1) \bmod 31) \quad \text{Equation 3}$$

Here, s(i)=1−2x(i), 0≤i≤30, x(j+5)=(x(j+2)+x(j))mod 2, and 0≤j≤25, and an initial condition x(0)=0, x(1)=0, x(2)=0, x(3)=0, x(4)=1.

The indices m0 and m1 are obtained on the basis of $N^{(2)}_{ID}$, and a combination of m0 and m1 has a range of 0 to 167. Accordingly, $N^{(1)}_0$ within a PCI group is determined by the combination of the indices m0 and m1.

A UE receives a PSS and determines $N^{(2)}_{ID}$. Furthermore, the UE receives an SSS and determines $N^{(1)}_{ID}$ from m0 and m1. Consequently, the UE may determine the PCI $N^{cell}_{ID}$ of a specific cell as $N^{cell}_{ID}=N^{(1)}_{ID}+N^{(2)}_{ID}$.

The PCI $N^{cell}_{ID}$ is used to transmit various cell-specific signals and/or UE-specific signals. As disclosed in 3GPP TS 36.211 V8.7.0 (2009-05), the PCI $N^{cell}_{ID}$ is associated with various downlink/uplink operations, such as the configurations of a physical control channel and a physical data channel, the configuration of a physical signal, the generation of an RS sequence, the initialization of a scrambling code, the selection of a cyclic shift, the selection of a root sequence, and the generation of a hopping pattern. They are called PCI-related operations.

More particularly, the PCI $N^{cell}_{ID}$ is used to initialize the scrambling sequence of a Physical Uplink Shared Channel (PUSCH).

The PCI $N^{cell}_{ID}$ is used to determine the hopping pattern of the PUSCH.

The PCI $N^{cell}_{ID}$ may be used to determine a hopping pattern (a group hopping and sequence hopping) of an uplink reference signal.

The PCI $N^{cell}_{ID}$ is used to initialize at least any one scrambling sequence of a Physical Broadcast Channel (PBCH), a Physical Control Format Indicator Channel (PCFICH), a Physical Downlink Control Channel (PDCCH), and a Physical HARQ Indicator Channel (PHICH).

The PCI $N^{cell}_{ID}$ is used for at least any one resource mapping of the PCFICH, the PDCCH, and the PHICH.

The PCI $N^{cell}_{ID}$ is used to generate the sequences of downlink reference signals (a cell-specific reference signal and a UE-specific reference signal).

A scheme in which the PCI $N^{cell}_{ID}$ is used in a downlink reference signal is described in detail.

A Reference Signal (RS) may be divided into a common RS and a dedicated RS. The common RS is a reference signal used by all the UEs within a cell and is used for channel measurement and/or data demodulation. The dedicated RS is a reference signal used by a specific UE or a specific UE group within a cell and is chiefly used for data demodulation.

A downlink reference signal in 3GPP LTE is described below.

Figure 3:
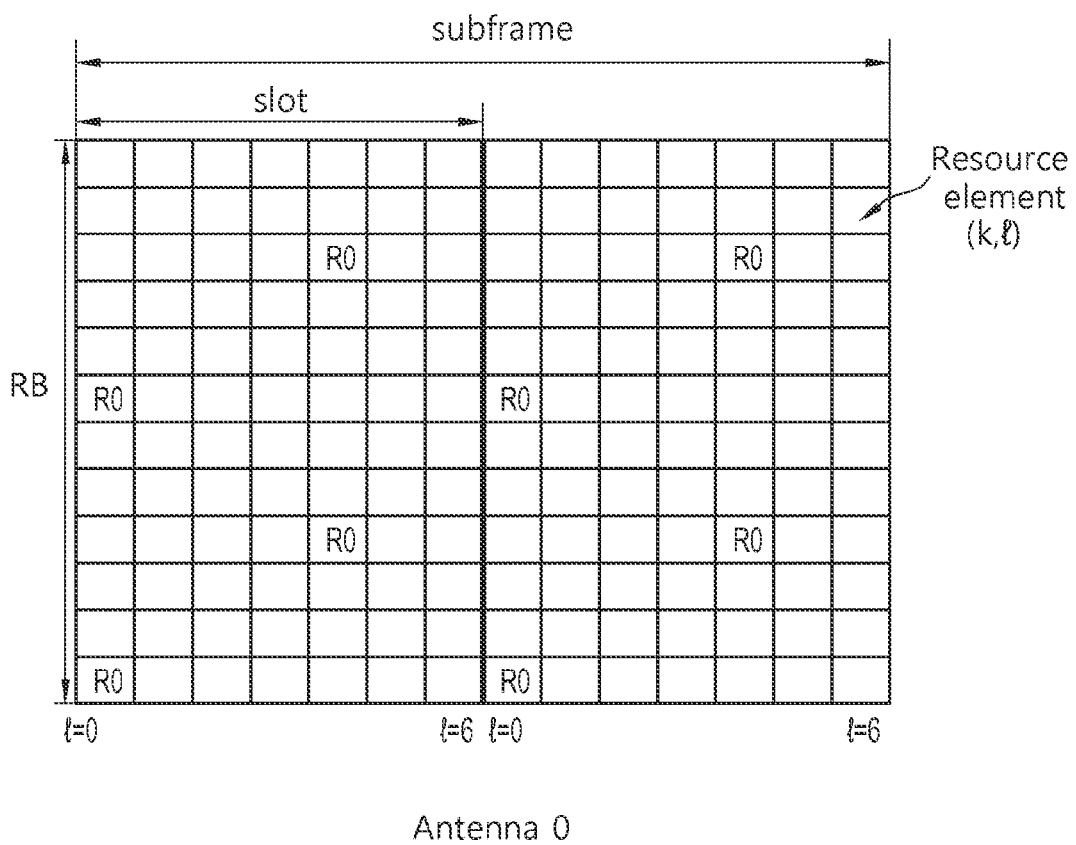
FIG. 3 shows an example of a common reference signal (RS) structure when a Base Station (BS) uses one antenna.
Figure 4:
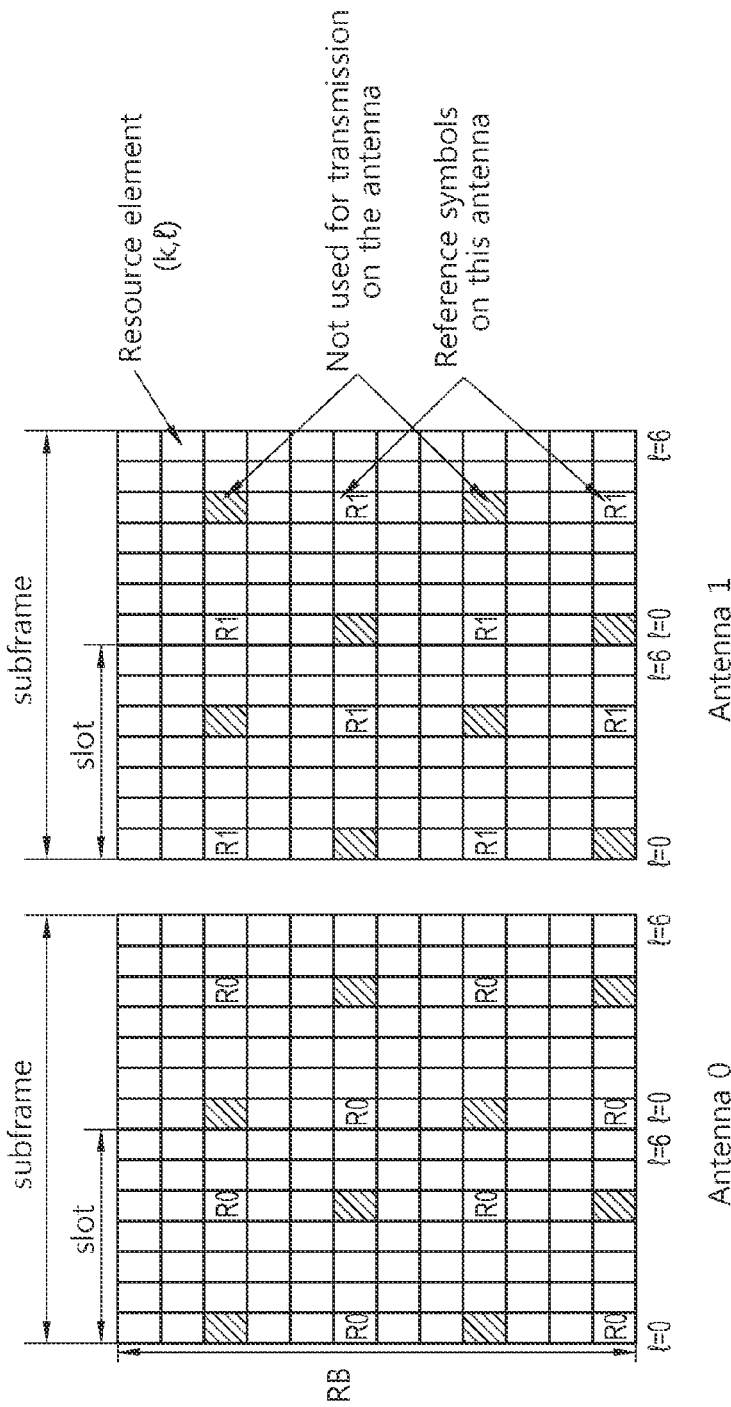
FIG. 4 shows an example of a common RS structure when a BS uses two antennas.
Figure 5:
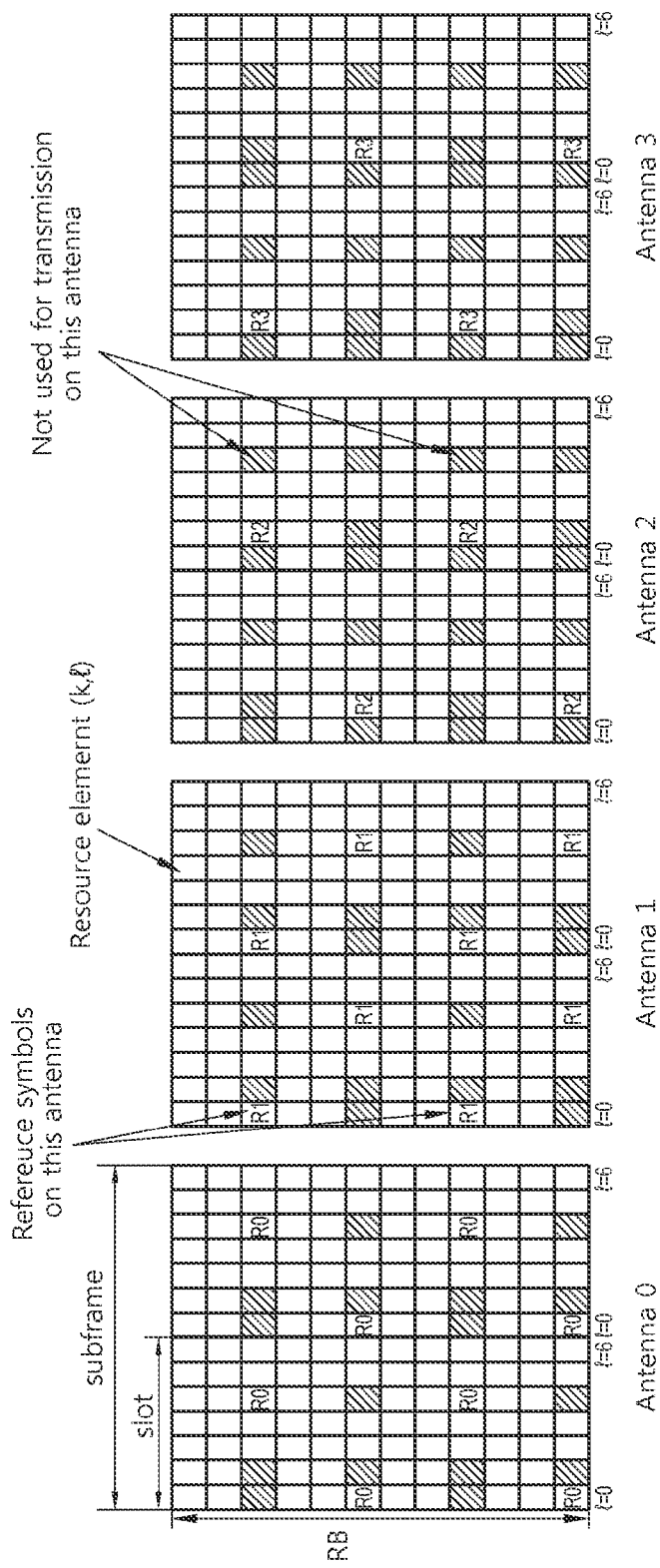
FIG. 5 shows an example of a common RS structure when a BS uses four antennas.

FIG. 3 shows an example of a common RS structure when a BS uses one antenna. FIG. 4 shows an example of a common RS structure when a BS uses two antennas. FIG. 5 shows an example of a common RS structure when a BS uses four antennas.

Referring to FIGS. 3 to 5, in case of multi-antenna transmission in which a BS uses a plurality of antennas, one resource grid exists in each antenna. 'R0' indicates an RS for a first antenna, 'R1' indicates an RS for a second antenna, 'R2' indicates an RS for a third antenna, and 'R3' indicates an RS for a fourth antenna. Positions of R0 to R3 within a subframe do not overlap with each other. l is the position of an OFDM symbol within a slot, and l has a value from 0 to 6 in a normal CP. In one OFDM symbol, an RS for each antenna is placed at an interval of 6 subcarriers. The number of R0s and the number of R1s within the subframe are identical with each other, and the number of R2s and the number of R3s within the subframe are identical with each other. Each of the number of R2s and the number of R3s within the subframe is smaller than each of the number of R0s and the number of R1s. A resource element used in the RS of one antenna is not used in the RS of another antenna in order to avoid inter-antenna interference.

The common RS is always transmitted by the number of antennas irrespective of the number of streams. The common RS has an independent reference signal for every antenna.

The position of the frequency domain and the position of the time domain within the subframe of the common RS are determined irrespective of UE. A common RS sequence multiplied to the common RS is generated irrespective of UE. Accordingly, all the UEs within a cell can receive the common RS. However, the position of the common RS within the subframe and the common RS sequence may be determined by a PCI. Accordingly, the common RS is also called a cell-specific RS.

The position of the time domain within the subframe of the common RS may be determined by the number of antennas and the number of OFDM symbols within a resource block. The position of the frequency domain within the subframe of the common RS may be determined by the number of antennas, a cell ID, an OFDM symbol index l, a slot number within a radio frame, etc.

The common RS sequence may be applied to each OFDM symbol within one subframe. The common RS sequence may vary according to a cell ID, a slot number within one radio frame, an OFDM symbol index within a slot, a type of a CP, etc.

The number of RS subcarriers for each antenna within a resource block on one OFDM symbol is 2. Assuming that a subframe includes $N^{DL}$ resource blocks in the frequency domain, the number of RS subcarriers for each antenna on one OFDM symbol is $2 \times N^{DL}$. Accordingly, the length of the common RS sequence becomes $2 \times N^{DL}$.

The equation bellows shows an example of the common RS sequence r(m).

$$r_{l,ns}(m) = \frac{1}{\sqrt{2}}(1-2\cdot c(2m)) + j\frac{1}{\sqrt{2}}(1-2\cdot c(2m+1)) \quad \text{Equation 4}$$

Here, $n_s$ is a slot number within a radio frame, l is an OFDM symbol number within a slot, and m is 0,1, ..., $2N^{max,DL}-1$. $N^{max,DL}$ is the number of resource blocks corresponding to a maximum bandwidth. For example, in 3GPP LTE, $N^{max,DL}$ is 110.

A random sequence c(i) may be defined by a gold sequence of length-31 as follows.

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{Equation 5}$$

Here, n=0,1, ..., 30, $N_C$=1600, $x_1(i)$ is a first m-sequence, and $x_2(i)$ is a second m-sequence.

The first m-sequence x1(i) is reset to $x_1(0)=1$, $x_1(n)=0$, n=0, 1, 2, ..., 30, and the second m-sequence $x_2(i)$ is reset to $2^{10}(7(n_s+1)+/+1+1)(2 N^{cell}_{ID}+1)+2 N^{cell}_{ID}+N_{cp}$. $N_{cp}=1$ in a normal CP, and $N_{cp}=0$ in an extended CP.

A dedicated RS sequence may also be obtained by Equations 4 and 5. However, m in Equation 5 is defined by $N^{PDSCH}$ which is the number of resource blocks pertinent to a bandwidth corresponding to PDSCH transmission.

Since the PCI $N^{cell}_{ID}$ is used to initialize the downlink RS sequence as described above, it can be seen that a downlink reference signal is dependent on the PCI $N^{cell}_{ID}$.

Figure 6:
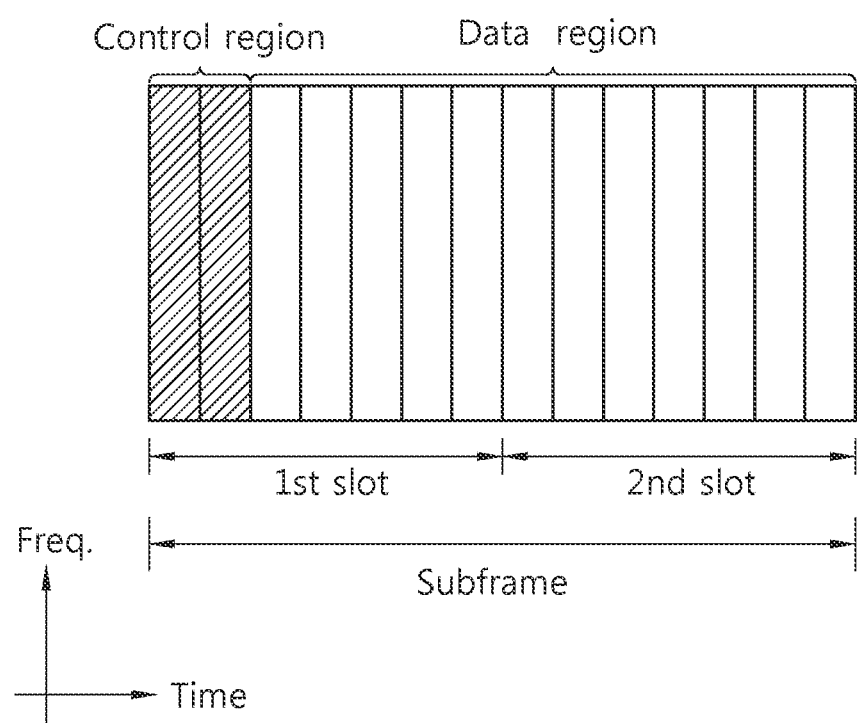
FIG. 6 shows the structure of a downlink subframe in 3GPP LTE.

FIG. 6 shows the structure of a downlink subframe in 3GPP LTE. A subframe is divided into a control region and a data region in the time domain. The control region includes a maximum of 3 former OFDM symbols of the first slot of the subframe, but the number of OFDM symbols included in the control region may be changed. A PDCCH is allocated to the control region, and a PDSCH is allocated to the data region.

A PCFICH transmitted through the first OFDM symbol of the subframe carries a Control Format Indicator (CFI) regarding the number of OFDM symbols (i.e., the size of the control region) which are used to transmit control channels within the subframe. UE first receives the CFI on the PCFICH and monitors a PDCCH.

A PHICH carries positive-acknowledgement (ACK)/negative-acknowledgement (NACK) signals for an uplink Hybrid Automatic Repeat Request (HARQ). The ACK/NACK signals for uplink data transmitted by UE are transmitted through the PHICH.

Control information transmitted through a PDCCH is called Downlink Control information (DCI). The DCI may include the resource allocation (also referred to as a DL grant) of a PDSCH, the resource allocation (also referred to as an UL grant) of a PUSCH, a set of transmission power control commands for individual UEs within a UE group and/or the activation of a Voice over Internet Protocol (VoIP).

As disclosed in section 9 of 3GPP TS 36.213 V8.7.0 (2009-05), blind decoding is used to detect the PDCCH. Blind decoding is a scheme for checking the owner or use of a PDCCH by demasking a specific identifier to the Cyclic Redundancy Check (CRC) of a received PDCCH (also referred to as a PDCCH candidate) and then checking a CRC error. UE monitors one or more PDCCHs for every subframe. Here, monitoring means that UE attempts to decode the PDCCH according to a monitored PDCCH format.

A multiple carrier system is described below.

A 3GPP LTE system supports a case where a downlink bandwidth and an uplink bandwidth are differently set, but one Component Carrier (CC) is a precondition for the case. This means that, in the state where one CC is defined for each of downlink and uplink, 3GPP LTE supports only a case where the downlink bandwidth is identical with or different from the uplink bandwidth. For example, the 3GPP LTE system may support a maximum of 20 MHz and have different uplink bandwidth and downlink bandwidth, but supports only one CC in each of uplink and downlink.

A spectrum aggregation (also called a bandwidth aggregation or a carrier aggregation) supports a plurality of CCs. The spectrum aggregation is introduced in order to support an increased throughput, prevent an increase of costs due to the introduction of a broadband Radio Frequency (RF), and guarantee compatibility with the existing system. For example, if 5 CCs are assigned as the granularity of a carrier unit having a 20 MHz bandwidth, a maximum bandwidth of 100 MHz can be supported.

CCs may have different sizes (i.e., bandwidths). For example, assuming that 5 CCs are used to configure a 70 MHz bandwidth, the 70 MHz bandwidth may be configured using a 5 MHz carrier (CC #0)+a 20 MHz carrier (CC #1)+a 20 MHz carrier (CC #2)+a 20 MHz carrier (CC #3)+a 5 MHz carrier (CC #4).

A case where the number of downlink CCs is identical with the number of uplink CCs or a downlink bandwidth is identical with an uplink bandwidth is called a symmetric aggregation. A case where the number of downlink CCs is different from the number of uplink CCs or a downlink bandwidth is different from an uplink bandwidth is called an asymmetric aggregation.

One or more Medium Access Control (MAC) entities may manage and operate one or more CCs and transmit and receive the one or more CCs. The MAC entity has a higher layer of a physical layer (PHY layer). For example, the MAC entity may have an MAC layer and/or a higher layer.

FIG. 7 shows an example of a transmitter and a receiver in which one MAC entity operates multiple carriers. The subfigure (A) shows the transmitter, and the subfigure (B) shows the receiver. One PHY layer corresponds to one CC, and a plurality of PHY layers PHY 0, . . . , PHY n−1 is operated by one MAC entity. Mapping between the MAC layer and the plurality of PHY layers PHY 0, . . . , PHY n−1 may be performed dynamically or statically.

FIG. 8 shows another example of a transmitter and a receiver in which multiple MACs operate multiple carriers. Unlike in the example of FIG. 7, a plurality of MACs MAC 0, . . . , MAC n−1 is mapped to a plurality of PHY layers PHY 0, . . . , PHY n−1 in a 1:1 way.

FIG. 9 shows yet another example of a transmitter and a receiver in which multiples MACs operate multiple carriers. Unlike in the example of FIG. 7, the total number of MACs k differs from the total number of PHY layers n. Some MACs MAC 0 and MAC 1 are mapped to respective PHY layers PHY 0 and the PHY 1 in a 1:1 way, and an MAC MAC k−1 is mapped to a plurality of PHY layers PHY n−2 and PHY n−2.

Figure 10:
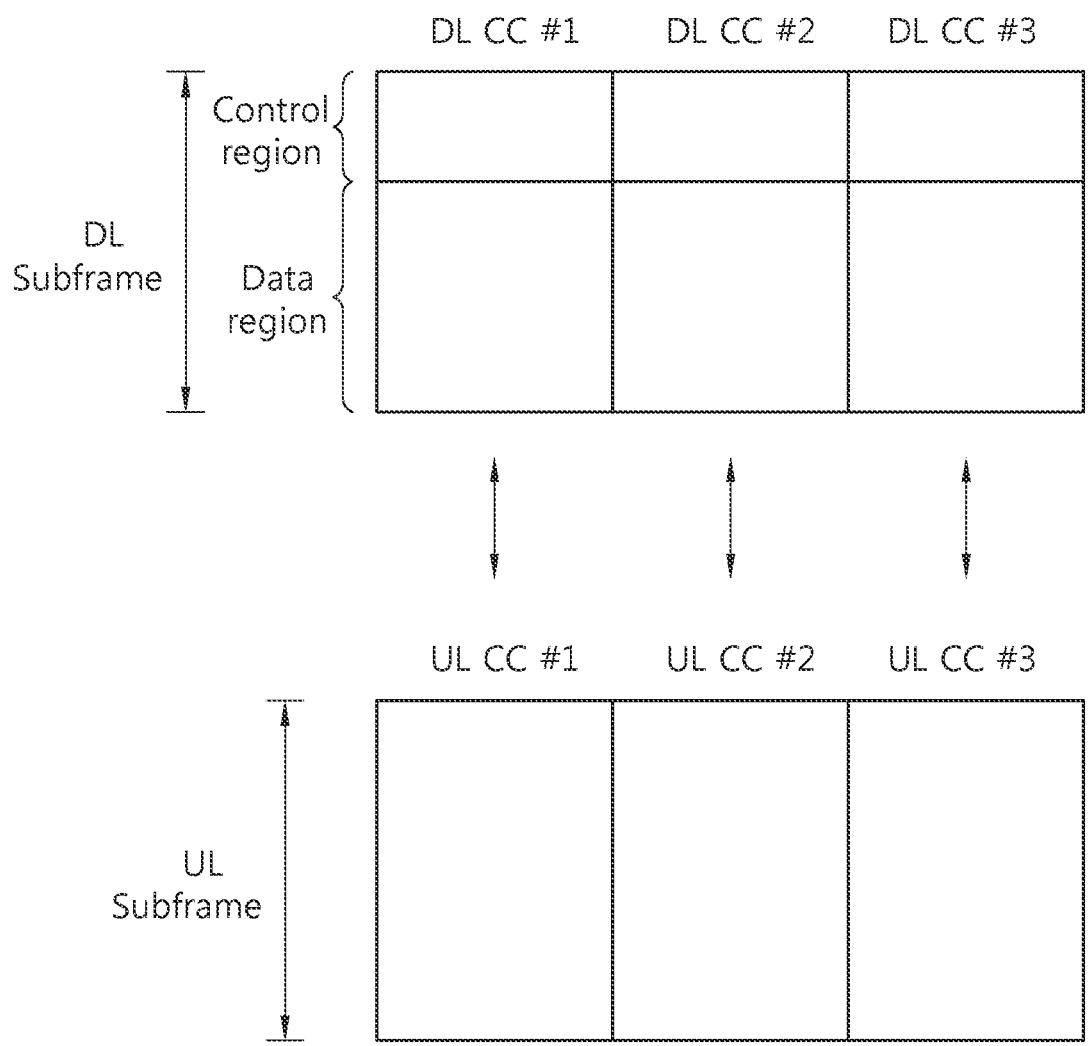
FIG. 10 shows an example of multiple carriers.

FIG. 10 shows an example of multiple carriers. Three DL CCs and three UL CCs are shown to exist, but the number of DL CCs and the number of UL CCs are not limited. A PDCCH and a PDSCH are independently transmitted in respective DL CCs, and a PUCCH and a PUSCH are independently transmitted in respective UL CCs. Alternatively, the control region may not be defined in a PDCCH because the PDCCH is not transmitted on any DL CC.

In a multiple carrier system, a linkage may be defined between a DL CC and a UL CC. The linkage may be configured based on E-UTRA Absolute Radio Frequency Channel Number (EARFCN) information included in downlink system information or may be configured by using a fixed DL/UL Tx/Rx separation relationship. The linkage refers to a mapping relationship between a DL CC on which a PDCCH carrying an UL grant is transmitted and a UL CC using the UL grant. Alternatively, the linkage may be a mapping relationship between a DL CC (or a UL CC) on which data for an HARQ is transmitted and a UL CC (or a DL CC) on which HARQ ACK/NACK signals are transmitted. A BS may inform UE of linkage information through a higher layer message, such as an RRC message, or part of system information. The linkage between the DL CC and the UL CC may be fixed, but a linkage between cells/UEs may be changed.

The example of FIG. 10 is a symmetric aggregation in which the DL CC and the UL CC are mapped in a 1:1 way.

FIG. 11 shows an example of an asymmetric aggregation. The asymmetric aggregation includes 'DL heavy' in which DL CCs and UL CCs are mapped to each other in a 'n:1 (n>1)' way as shown in FIG. 11(A) and 'UL heavy' in which DL CCs and UL CCs are mapped to each other in a '1:n (n>1)' way as shown in FIG. 11(B).

As described above, in 3GPP LTE, the PCI is a unique value within a cell and used to transmit various UL channels, DL channels, UL reference signals, and DL reference signals. In a symmetrical aggregation in which DL CCs and UL CCs are mapped to each other in a 1:1 way, although a PCI obtained from a DL CC is used in a relevant UL CC, the ambiguity or confusion of an operation is not generated. This is because the PCI may be uniquely defined for the DL CC. In an asymmetric aggregation, however, the ambiguity of an operation may be generated.

FIG. 12 shows ambiguity due to a PCI in an asymmetric aggregation.

The subfigure (A) of FIG. 12 shows 'DL Heavy' in which that a DL CC #1 is assumed to have a PCI A and a DL CC #2 is assumed to have a PCI B. Ambiguity may occur regarding that a UL CC #1 linked to the DL CC #1 and the DL CC #2 will define PCI-related operations by using what PCI.

In 3GPP LTE, the ambiguity or confusion of an operation is not generated because PCI-related operations are performed on the basis of a PCI detected from a DL CC which is linked to a UL CC in a 1:1 way. In a multiple carrier system, however, ambiguity may be generated in PCI-related operations associated with the existing PCI according to whether a plurality of DL CCs uses the same PCI or different PC's.

The subfigure (B) of FIG. 12 shows 'UL Heavy' in which a DL CC #1 is assumed to have a PCI A. Both a UL CC #1 and a UL CC #2 linked to the DL CC #1 may define PCI-related operations by using the same PCI A. If the same PCI is used in multiple UL CCs, however, a Peak-to-Average Power Ratio (PAPR) problem may occur.

A plurality of DL CCs may all have the same PCI or different PC's. If different PCIs are used, a PSS and an SSS have only to be configured according to a similar scheme to the existing scheme. However, the ambiguity of an operation may occur, and there may be a difficulty in cell planning due to the shortage of PC's. If the same PCI is used, ambiguity is not generated in operations based on the PCI in an UL CC.

A Backward Compatible (BC) CC is a CC that provides backward compatibility to 3GPP LTE, supports operations based on 3GPP LTE, and uses the PHY structure of 3GPP LTE without change. The BC CC is also called an accessible CC.

A Non-Backward Compatible (NBC) CC is a CC that does not backward compatibility to 3GPP LTE.

The PCI (referred to as an extended PCI) of an NBC CC may be extended from the PCI of a BC CC. The PCI of the BC CC is defined as a value ranging from 0 to 503, and the extended PCI of the NBC CC is determined from among value greater than 503. In order to determine the extended PCI, 4 PSS sequences greater than 3 PSS sequences may be defined, or one PCI group may include the number of cell identifiers greater than 168. For example, the extended PCI $N^{ext}_{ID}$ may be defined like $N^{cell}_{ID}=3N^{ext(1)}_{ID}+N^{ext(2)}_{ID}$. $N^{ext(1)}_{ID}$ may be defined to have a value ranging from 0 to 4 or $N^{ext(2)}_{ID}$ may be defined to have a value ranging from 0 to 180. The extended PCI may be differently defined by making different the scrambling sequence of an SSS.

The PCI of the NBC CC may be set to be identical with the PCI of the BC CC. However, the PCI of the NBC CC used to transmit a channel or an RS may be separately determined. This is called the extended PCI $N^{ext}_{ID}$. Here, the extended PCI may have a value greater than 503, but this is not the PCI of the NBC CC. The extended PCI differs from the PCI of the NBC CC in that it is used to only transmit a channel or an RS. For example, a downlink RS sequence is reset to $2^{10}(7(n_s+1)+/+1+1)(2 N^{cell}_{ID}+1)+2 N^{cell}_{ID}+Ncp$, but is reset to $2^{10}(7(n_s+1)+/+1+1)(2 N^{ext}_{ID}+1)+2 N^{cell}_{ID}+Ncp$ by using the extended PCI $N^{ext}_{ID}$.

The extended PCI may be used as one concept of two types. One of the two types is that the extended PCI is the PCI of the NBC CC. The extended PCI may become a unique identifier to identify the NBC CC, and the extended PCI may function as a CC index. The other of the two types is that the extended PCI is not the PCI of the NBC CC itself, but is used in PCI-related operations by replacing the PCI of the existing BC CC $N^{cell}_{ID}$. Here, the extended PCI is called a signature. The extended PCI may become an identifier to indicate an NBC CC, but UE is unable to know that the relevant CC is the NBC CC in an access step. A plurality of extended PCIs may be used in the NBC CC.

More particularly, an example where the extended PCI is used to transmit a channel or an RS is as follows. The extended PCI $N^{ext}_{ID}$ may be used to initialize the scrambling sequence of a PUSCH or to determine the hopping pattern of the PUSCH. The extended PCI $N^{ext}_{ID}$ may be used to determine the hopping pattern (group hopping and sequence hopping) of a UL RS. The extended PCI $N^{ext}_{ID}$ may be used to initialize the scrambling sequence of a PCFICH. The extended PCI $N^{ext}_{ID}$ may be used for the resource mapping of a PDCCH. The extended PCI $N^{ext}_{ID}$ may be used to determine a DL RS sequence.

According to the conventional 3GPP LTE, one PCI is defined in each cell, and RS sequences are mapped to each other in a 1:1 way. In order to identify the NBC CC and the BC CC, an RS sequence mapped to one PCI may be extended into 1:n. Accordingly, RS sequences generated on the basis of the PCI are used in the BC CC, as in the existing scheme, and RS sequences generated on the basis of the extended PCI or a new parameter are used in the NBC CC. UE may obtain the extended PCI from an RS sequence received through the NBC CC. In this case, there is an advantage in that the NBC CC uses the same PCI as the BC CC and the extended PCIs may also be distinguished from each other using RS sequences. Alternatively, a 1:n mapping relationship can be established in such a manner that the RS sequence is the same, but the positions of the time domain or the frequency domain in which RSs are disposed are different in the BC CC and the NBC CC.

A case where two DL CCs are linked to one UL CC is taken into consideration. The first DL CC may use a PCI in order to transmit a channel or an RS, and the second DL CC may use an extended PCI in order to transmit a channel or an RS. The extended PCI may be obtained on the basis of the PCI. That is, as in the existing cell search, the first DL CC determines the PCI from a PSS and an SSS. The extended PCI of the second DL CC is newly defined on the basis of the PCI. A BS may inform UE of information about the extended PCI or information for determining the extended PCI. For example, assuming that the extended PCI is defined as $N^{ext}_{ID}=2N^{cell}_{ID}+f$, the BS informs the UE of information about 'offset f'.

The PCI $N^{cell}_{ID}$ of the existing 3GPP LTE has a range of 0 to 503. If the number of extended PCIs $N^{ext}_{ID}$ is 1008, the number of PCIs and the number of extended PCIs have a relationship 1:2. Here, $N^{ext}_{ID}=k*N+N^{cell}_{ID}$. N is the number of PCIs (i.e., 504), and k is 0 in the BC CC and 1 in the NBC CC.

According to the proposed extended PCI, UE can check whether a CC is the BC CC or the NBC CC, and ambiguity in an asymmetric aggregation is solved. Furthermore, the NBC CC may use a PCI having a range of 0 to 503 as the PCI of a CC as in the existing scheme or may use the extended PCI itself as the PCI of a CC.

The use of an extended PCI in a DL CC may function as a CC indicator for determining whether the DL CC is the NBC CC or the BC CC. If a channel or an RS is transmitted using the extended PCI different from the PCI of a DL CC, UE may know that the relevant DL CC is the NBC CC.

Figure 13:
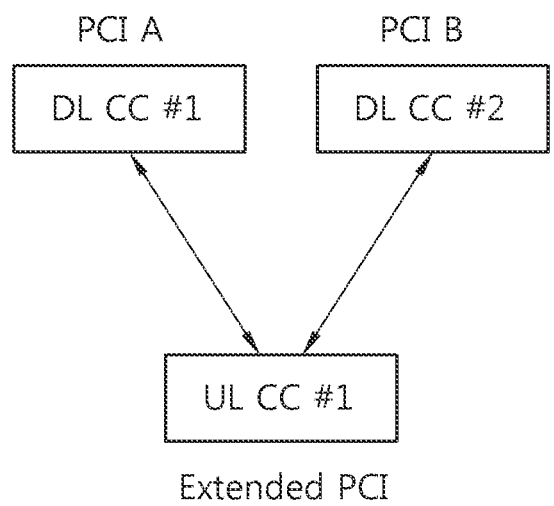
FIG. 13 shows a CC configuration according to an embodiment of present invention.

FIG. 13 shows a CC configuration according to an embodiment of present invention.

It is assumed that a DL CC #1 has a PCI A and a DL CC #2 has a PCI B. A UL CC #1 linked to the DL CC #1 and the DL CC #2 uses an extended PCI. The extended PCI may be the same as the PCI A or the PCI B or may be obtained on the basis of the PCI A or the PCI B. A BS may inform UE of information used to obtain the extended PCI. For example, if the extended PCI is a value defined by an offset of the PCI B, the BS may inform the UE of information about the offset.

Figure 14:
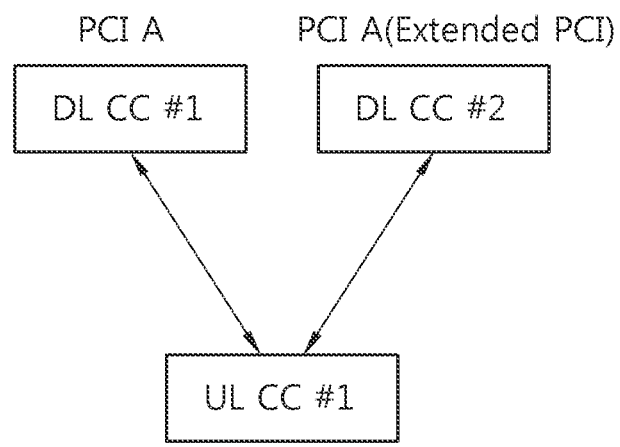
FIG. 14 shows a CC configuration according to another embodiment of present invention.

FIG. 14 shows a CC configuration according to another embodiment of present invention.

It is assumed that a DL CC #1 has a PCI A and a DL CC #2 also has the PCI A. The PCI of the DL CC #2 is the PCI A, but may be distinguished from the PCI A of the DL CC #1 by an extended PCI. The DL CC #1 and the DL CC #2 are distinguished from each other by different signatures. There is no ambiguity due to a PCI because a UL CC #1 linked to the DL CC #1 and the DL CC #2 can perform the PCI-related operations using the PCI A.

UE can know that the PCI of the DL CC #2 is the PCI A, but the DL CC #2 uses the extended PCI. For example, the DL RS of the DL CC #2 is generated on the basis of the extended PCI. Accordingly, the UE can know that the DL CC #2 is an NBC CC and perform PCI-related operations on the basis of the extended PCI.

The use of an extended PCI in a DL CC may function as a CC indicator for determining whether the relevant DL CC is an NBC CC or a BC CC.

Figure 15:
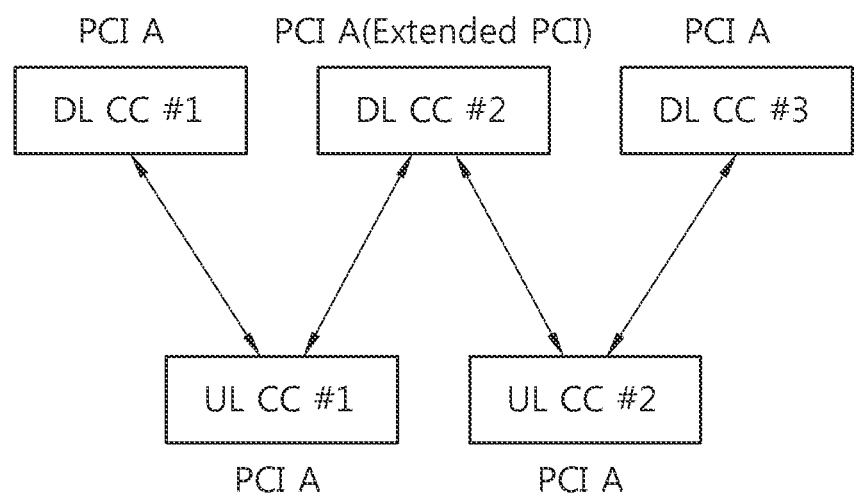
FIG. 15 shows a CC configuration according to yet another embodiment of present invention.

FIG. 15 shows a CC configuration according to yet another embodiment of present invention.

It is assumed that DL CCs #1, #2, and #3 have the same PCI A. A UL CC #1 linked to the DL CC #1 and the DL CC #2 may use the PCI A. A UL CC #2 linked to the DL CC #2 and the DL CC #3 may use the PCI A. The DL CC #2 (i.e., an NBC CC) uses an extended PCI.

Figure 16:
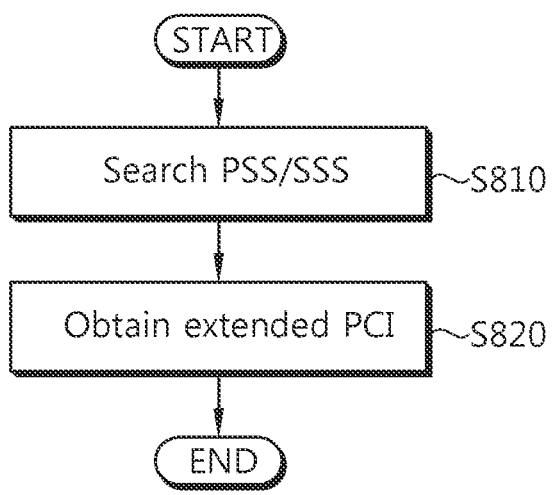
FIG. 16 is a flowchart showing a cell search method according to an embodiment of present invention.

FIG. 16 is a flowchart showing a cell search method according to an embodiment of present invention. A cell search includes an initial cell search in which UE attempts to access a cell at the early stage and a cell re-search in which UE now accessing a cell moves to another cell. The cell search includes the initial cell search and the cell re-search.

UE searches for a PSS and an SSS (S810). The UE obtains an extended PCI on the basis of the PSS and the SSS (S820). The UE may obtain the extended PCI from the index of the PSS, the position of the SSC, and a scrambling code for the SSC. The UE performs PCI-related operations on the basis of the extended PCI.

Figure 17:
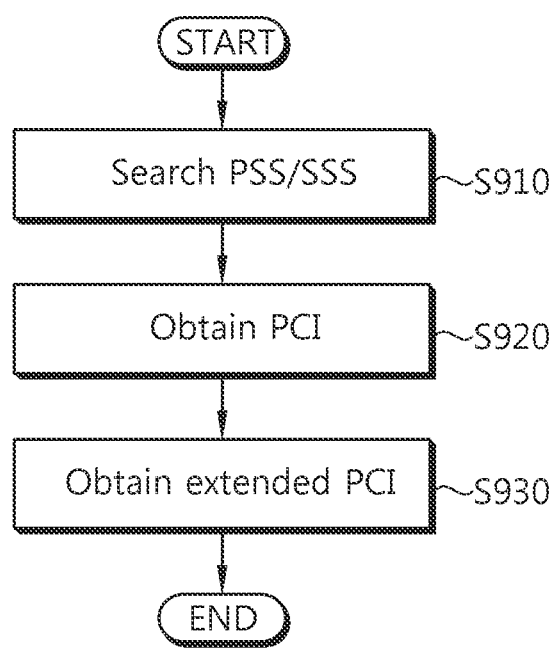
FIG. 17 is a flowchart showing a cell search method according to another embodiment of present invention.

FIG. 17 is a flowchart showing a cell search method according to another embodiment of present invention.

UE searches for a PSS and an SSS (S910). The UE obtains a PCI on the basis of the PSS and the SSS (S920). The UE obtains an extended PCI on the basis of the PCI (S930). A BS may inform the UE of information for determining the extended PCI. The UE performs PCI-related operations on the basis of the extended PCI.

In the above embodiments, examples where the technical spirit of the present invention is applied to the cell search have been illustrated, but they are only illustrative. In order to prevent the ambiguity of PCI-related operations based on a PCI in a multiple carrier system, the technical spirit of the present invention may be applied to a variety of PCI-related operations (a method of transmitting an RS, a method of generating a scrambling code, etc.) in which the extended PCI is used.

Figure 18:
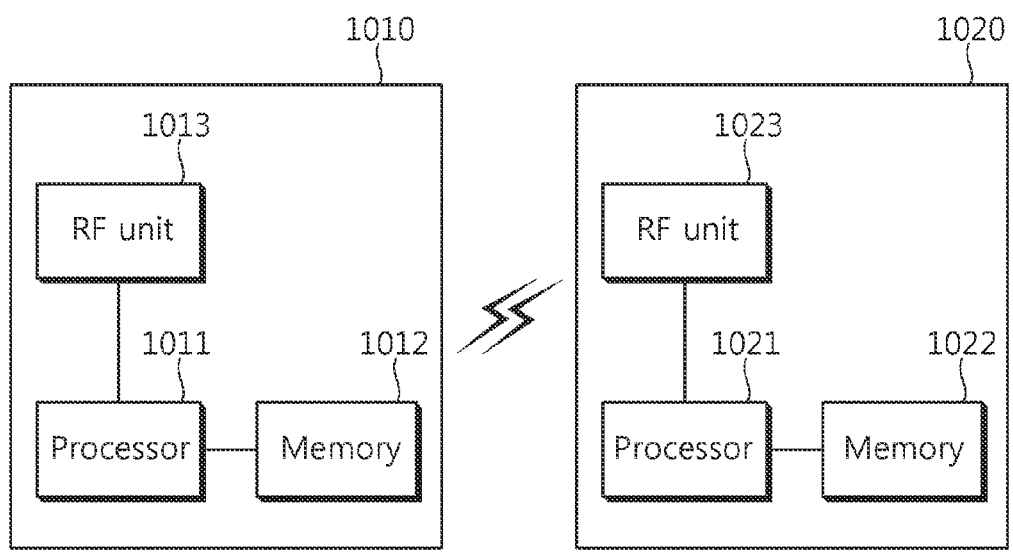
FIG. 18 a block diagram showing wireless apparatuses in which the embodiments of present invention are implemented.

FIG. 18 a block diagram showing wireless apparatuses in which the embodiments of present invention are implemented.

A UE 1010 includes a processor 1011, memory 1012, and a Radio Frequency (RF) unit 1013. The memory 1012 stores parameters for the operation of the processor 1011. The RF unit 1013 transmits and receives radio signals. The processor 1011 supports multiple carriers and implements the operations of the UE in the above embodiments.

The processor 1011 receives a PSS and an SSS and may obtain a PCI and/or an extended PCI on the basis of the PSS and the SSS. The extended PCI may be obtained on the basis of the PCI.

The processor 1011 may obtain a first PCI for a first DL CC and obtain an extended PCI for a second DL CC. The first PCI is obtained in the range of 0 to 503, and the extended PCI may have a value greater than 503.

The processor 1011 may directly obtain the extended PCI by searching for the PSS and the SSS of the second DL CC.

The processor 1011 may obtain a second PCI by searching for the PSS and the SSS of the second DL CC and then obtain the extended PCI on the basis of the second PCI. Here, the first PCI and the second PCI may be identical with each other. The extended PCI may be a value in which an offset has been added to the second PCI, and a BS may inform the UE of information about the offset.

The first DL CC may be a BC CC, and the second DL CC using the extended PCI may be an NBC CC. The processor 1011 may check whether it is an NBC CC according to whether the extended PCI is used.

The extended PCI may be used to transmit a channel or an RS. The extended PCI may be used to initialize the scrambling sequence of a PUSCH or to determine the hopping pattern of the PUSCH. The extended PCI may be used to determine the hopping pattern (group hopping and sequence hopping) of an UL RS. The extended PCI may be used to initialize the scrambling sequence of a PCFICH. The extended PCI may be used for the resource mapping of a PDCCH. The extended PCI may be used to determine a DL RS sequence.

A BS 1020 includes a processor 1021, memory 1022, and an RF unit 1023. The memory 1022 stores parameters for the operation of the processor 1021. The RF unit 1023 transmits and receives radio signals. The processor 1021 supports multiple carriers and implements the operations of the BS in the above embodiments.

The BS may inform UE of information about the extended PCI of the processor 1021.

The processor 1021 may determine whether the extended PCI is used according to whether it is a BC CC or an NBC CC.

The processor may include Application-Specific Integrated Circuits (ASICs), other chipsets, logic circuits, and/or data processors. When the above-described embodiment is implemented in software, the above-described scheme may be implemented using a module (process or function) which performs the above function.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A cell search method in a multiple carrier system, the method comprising:
    obtaining a first physical cell identity (PCI) for a first downlink component carrier; and
    obtaining an extended PCI for a second downlink component carrier,
    wherein a first downlink reference signal through the first downlink component carrier is transmitted based on the first PCI, and a second downlink reference signal through the second downlink component carrier is transmitted based on the extended PCI,
    wherein the extended PCI is obtained based on a primary synchronization signal (PSS) and a secondary synchronization signal (SSS) on the second downlink component carrier.

2. The method of claim 1, wherein the first PCI is obtained in a range of 0 to 503, and the extended PCI has a value greater than 503.

3. The method of claim 1, wherein obtaining the extended PCI comprises:
    obtaining a second PCI for the second downlink component carrier based on the PSS and the SSS on the second downlink component carrier; and
    obtaining the extended PCI based on the second PCI.

4. The method of claim 3, wherein the extended PCI is a value in which an offset has been added to the second PCI.

5. The method of claim 3, wherein the first PCI and the second PCI are same.

6. The method of claim 1, wherein the extended PCI is a value in which an offset has been added to the first PCI.

7. The method of claim 1, wherein the extended PCI is used to transmit a reference signal of an uplink carrier linked to the second component carrier.

8. The method of claim 1, wherein the extended PCI is used to transmit an uplink channel of an uplink carrier linked to the second downlink component carrier.

9. A user equipment for performing a cell search in a multiple carrier system, the user equipment comprising:
    a radio frequency (RF) unit configured to transmit and receive radio signals; and
    a processor coupled to the RF unit and configured to perform the cell search,
    wherein the processor is configured to:
    obtain a first physical cell identity (PCI) for a first downlink component carrier; and
    obtain an extended PCI for a second downlink component carrier,
    wherein a first downlink reference signal through the first downlink component carrier is transmitted based on the first PCI, and a second downlink reference signal through the second downlink component carrier is transmitted based on the extended PCI, and
    wherein the extended PCI is obtained based on a primary synchronization signal (PSS) and a secondary synchronization signal (SSS) on the second downlink component carrier.

10. The user equipment of claim 9, wherein the first PCI is obtained in a range of 0 to 503, and the extended PCI has a value greater than 503.

11. The user equipment of claim 9, wherein the processor is further configured to:
    obtain a second PCI for the second downlink component carrier based on the PSS and the SSS on the second downlink component carrier; and
    obtain the extended PCI based on the second PCI.

12. The user equipment of claim 11, wherein the extended PCI is a value in which an offset has been added to the second PCI.

13. The user equipment of claim 11, wherein the first PCI and the second PCI are identical with each other.

14. The user equipment of claim 9, wherein the extended PCI is a value in which an offset has been added to the first PCI.

15. The user equipment of claim 9, wherein the extended PCI is used to transmit a reference signal of an uplink carrier linked to the second downlink component carrier.

16. The user equipment of claim 9, wherein the extended PCI is used to transmit an uplink channel of an uplink carrier linked to the second downlink component carrier.

* * * * *